Feb. 20, 1945.  K. KOZAROCZY  2,369,901
WORK HOLDER AND VISE
Filed July 9, 1942  3 Sheets-Sheet 1
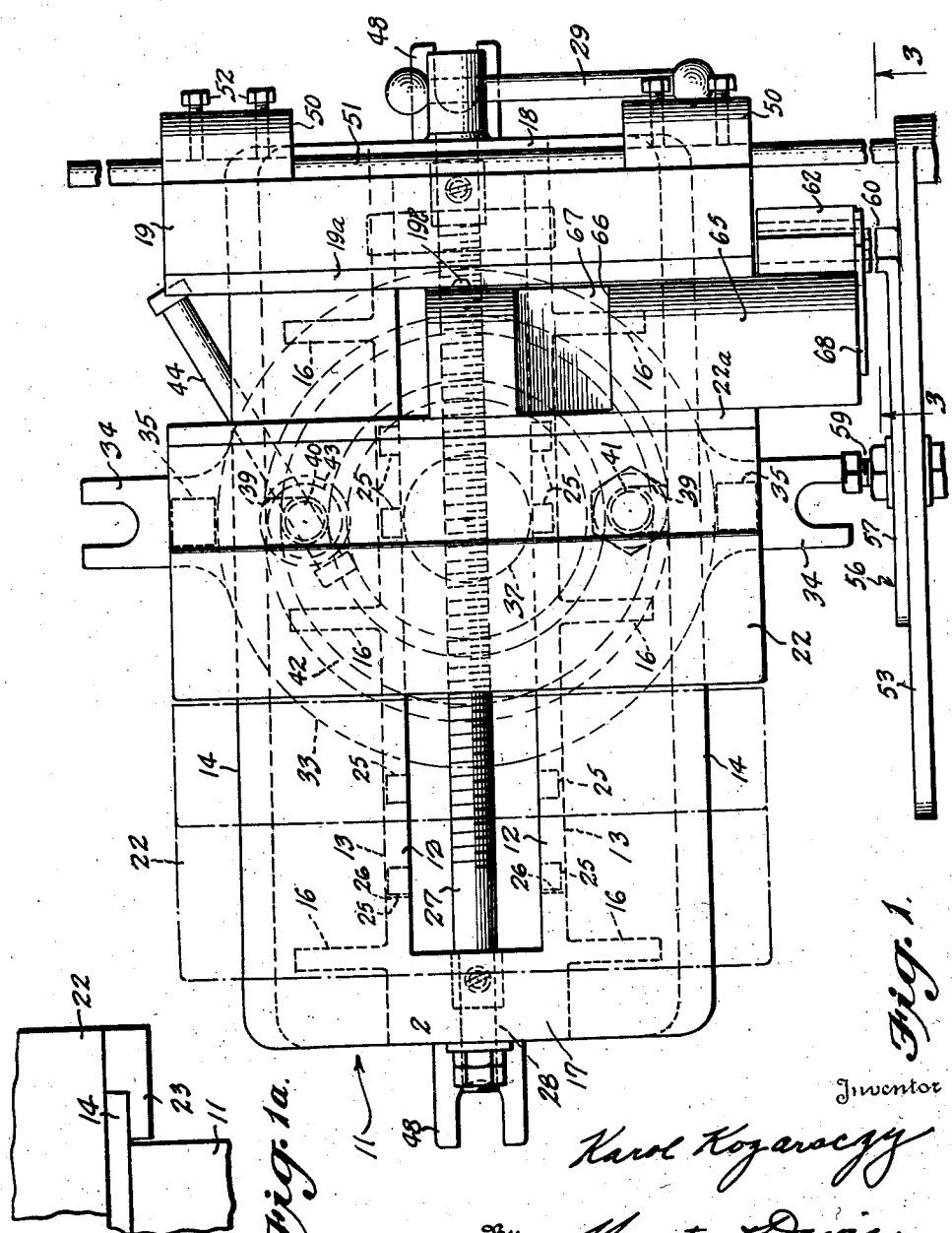

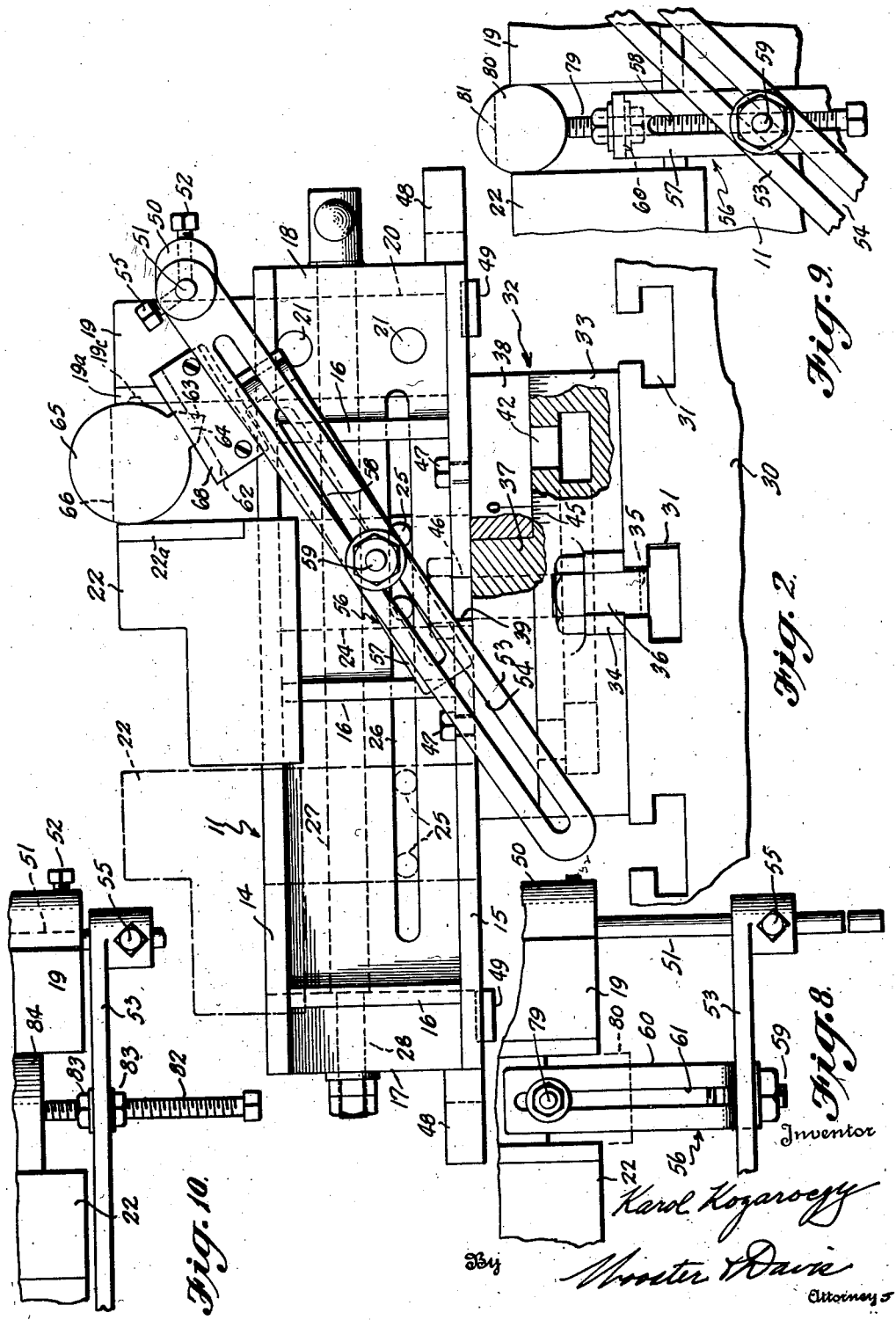

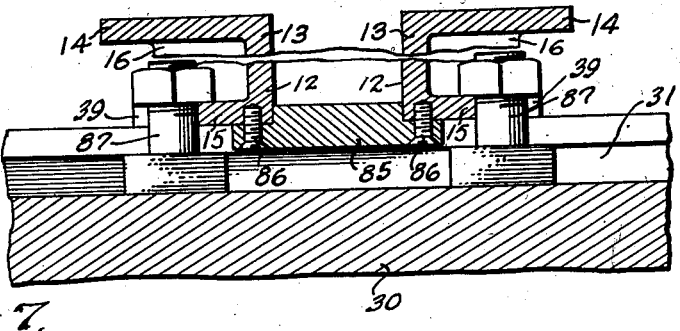
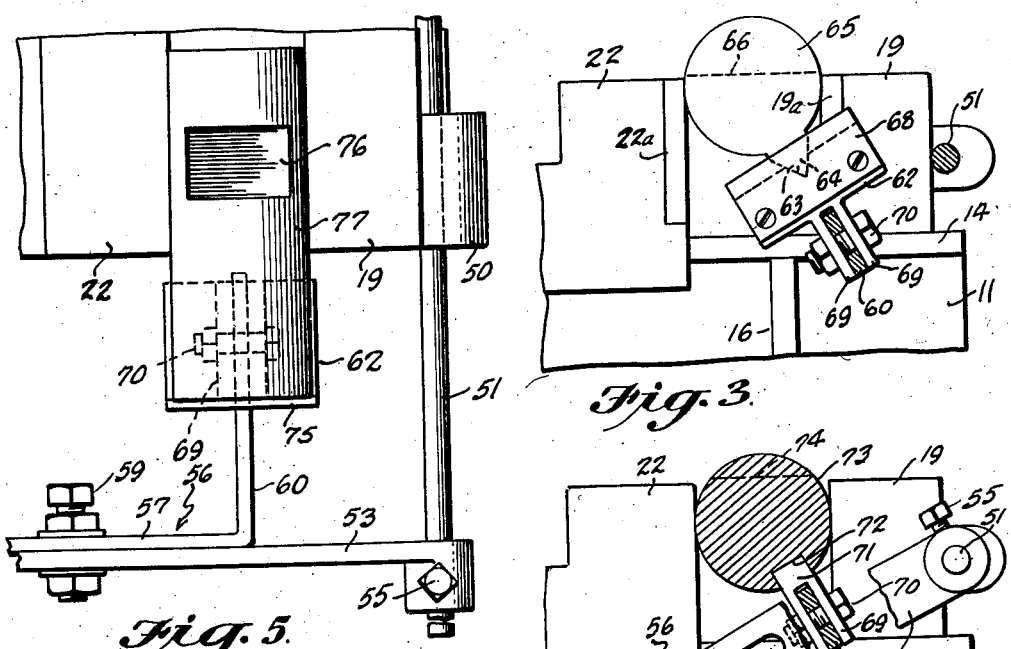
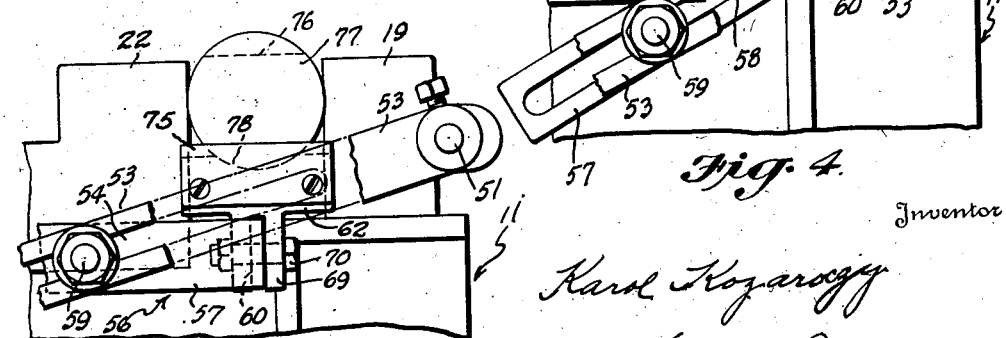

Patented Feb. 20, 1945

2,369,901

UNITED STATES PATENT OFFICE 2,369,901

WORK HOLDER AND VISE

Karol Kozaroczy, Bridgeport, Conn.

Application July 9, 1942, Serial No. 450,261

9 Claims. (Cl. 90—60)

This invention relates to a work holder and vise, and has for an object to provide an improved work holder and vise structure which may be used for holding work on the table of a machine tool such as a planer, shaper, drill press and the like, and may also be used upon and fastened to a bench or similar support.

It is also an object to provide a vise structure which may be adjusted at various angles and clamped in adjusted positions to hold the work at different angles, and it is a further object to provide an improved means for locating the work in the vise, and which may be employed as a locating gauge or stop adjustable relative to the jaws by which a number of similar successive work pieces may be brought to and quickly and easily located in the same position between the jaws to facilitate quickly performing similar operations on a number of like pieces and have them all the same when completed.

With the foregoing and other objects in view I have devised the construction illustrated in the accompanying drawings forming a part of this specification. It is, however, to be understood the invention is not limited to the specific details and arrangement shown but that various changes and modifications may be employed within the scope of the invention.

In these drawings:

Fig. 1 is a top plan view of the work holder and vise showing a work piece in position in the jaws;

Fig. 1a is a detail view showing how the movable jaw is mounted and looking from the left of Fig. 1;

Fig. 2 is a front elevation looking toward the bottom of Fig. 1;

Fig. 3 is a partial front elevation and partial section taken substantially on the line 3—3 of Fig. 1;

Fig. 4 is a view similar to Fig. 3 showing the use of a slightly different form of locating means;

Fig. 5 is a plan view of one end of the jaws showing the use of a slightly different locating means;

Fig. 6 is a view looking toward the bottom of Fig. 5;

Fig. 7 is a detail section through a portion of the base and the table of a machine tool;

Fig. 8 is a top plan view at one end of the jaws showing another manner of using the locating means;

Fig. 9 is an elevation looking toward the bottom of Fig. 8, and

Fig. 10 is a view similar to Fig. 8 showing another use of the locating means.

The vise comprises a body or base 11 including spaced side members 12 which may be of desired cross section but are each preferably substantially channel shaped with vertical webs 13 and upper horizontal flanges 14 and similar lower flanges 15 extending laterally and outwardly therefrom. This gives a very strong rigid construction of relatively light weight and with the use of less material, but to still further strengthen this structure upright integral ribs 16 may extend between the flanges 14 and 15. The side members 12 are connected at their rear ends by the integral transverse end portion or block 17 and at their forward ends by a similar block 18. At the forward end of the body is a stationary jaw 19 projecting above the body and may be rigidly mounted on the body by any suitable means. In the present case it has a downward extension 20 extending between the side members 12 and seated against the inner wall of the forward block or connection 18. Transverse pins 21 may be provided extending through the extension 20 and the webs 13 of the side members 12 to secure this jaw in place. The width of the jaw may be anything desired, but in the present case it is shown as extending somewhat beyond the side edges of the body.

Also mounted on the top of the body to cooperate with the stationary jaw 19 is a movable jaw 22. This is mounted to slide on the top of the body toward and from the jaw 19 to hold different pieces of work between them. It rests on top of the upper flanges 14 and may have downwardly and inwardly extending portions 23 (Fig. 1a) extending under the outer edge of the flange to retain the jaw on the body and guide it for longitudinal movement thereon. The jaw has a downward extension 24 projecting between the side members 12 and this extension may carry pins 25 projecting laterally therefrom into longitudinal slots 26 in the upright webs 13 of the side members to further guide the jaw and assist in retaining it in the proper upright position. This extension 24 is threaded on an adjusting screw 27 supported at its forward end to turn in the block 18 and at its rear end is supported by a suitable bearing 28 in the block 17. The screw may have a flange engaging the front of block 18 to prevent longitudinal movement of the screw. Suitable means may be provided for rotating the screw such as the usual transversely adjustable handle rod 29 to adjust the movable jaw back and forth and to clamp the work between two jaws. The jaws may have hardened steel plates or plates of other material different from the material of the body of the jaws as shown at 19a and 22a to engage the work, and they may have vertical and longitudinal grooves 19b and 19c for accurate and quick location of small articles such for example as rods and the like. The showing of plates 19a and 22a are omitted in Figs. 3 to 10 to simplify the drawings.

The body 11 may be mounted directly on a bench or similar support or directly on the table of the machine tool such as a planer, shaper, drill press and the like, or it can be mounted on an auxiliary base 32 which base is mounted on the bench or the table of the machine tool. This base includes mounting elements rotatable relative to each other so that the device may be adjusted to various angles about a vertical axis and secured in adjusted positions. Such a base is shown in Figs. 1 and 2. The table of the machine tool such as a planer, shaper and the like, is shown at 30 having the usual T-slots 31 for securing bolts of the clamps for holding work to the table. These T-slots are used for securing this vise to the table, the work to be operated on being held in the vise.

The auxiliary base comprises a base member 33 to seat directly on the table 30, bench or other support and it is of circular form and provided with open sided lugs 34 on its opposite sides, preferably having downward projections 35 on their undersides to seat in the upper narrower part of slots 31 and of the same width as the slots to position the auxiliary base on the table and at the proper angle and accurately located with respect to the T-slots and the table. The forked lugs 34 are adapted to receive T-shaped securing bolts 36 whereby the base may be clamped to the table. By loosening the bolts the device may be easily and quickly detached. The base or block 33 has an upwardly extending central stud 37 projecting into the center of an upper circular member 38 forming a pivot bearing so that this member turns on the member 33. It has forks or open sided recesses 39 in its opposite sides to receive clamping bolts 40 and 41 which have heads seated and running in circular T-slots 42 in the base member 33. The nut 43 on one of these bolts may have a handle 44 for clamping the upper member in adjusted position. There may be a scale indicated at 45 on the contiguous edges of the members 38 and 33 to give the number of degrees which the vise on the upper member 38 is turned. The vise is rigidly mounted on this member 38 but may be readily removed therefrom if it is desired to mount the vise itself directly on the table 30. It is secured to the member 38 by bolts 46 in open-sided recesses in the lower flange 15 and additional bolts 47 extending through the flange into the member 38 may be provided if desired. By loosening or removing these bolts the vise may be mounted directly on the table 30 and secured by T-shaped bolts 36 seated in the open-sided recesses used for the bolts 46. Additional securing means may be provided, such as forked lugs 48 at the opposite ends of the body to receive similar T-bolts 36 in the T-slots in the table. Blocks 49 may be mounted in the underside of the body of the width of the upper part of the T-slots of the table to seat in these slots and located adjacent the lugs 48 to assist in locating and mounting the vise on the table.

Improved locating means is provided to facilitate locating different pieces of work in the vise which is adapted for locating a number of successive pieces in the vise while it is mounted on the table of a machine tool where it is desired to perform a similar operation on any desired number of pieces and to insure that they are all the same, and do it in such a way that the pieces may be quickly and accurately located for these operations. For this purpose the stationary jaw 19 is provided with suitable bearings 50 for a rod 51, which rod is adjustable longitudinally and also rotatably in these bearings and may be secured in adjusted position by any suitable means, such as set screws 52. This rod carries an arm 53 having a longitudinal slot 54 and it is adjustable about the rod 51 and may be secured in adjusted position thereon by means of a set screw 55. A bracket 56 is adjustable along the arm 53, this bracket in the present case being L-shaped with one arm 57 mounted at one side of the arm 53 and provided with a longitudinal slot 58 through which may extend an adjusting and clamping screw 59. This screw extends through the slots 54 and 58 and by this means the arm 57 may be adjusted to any angle relative to the arm 53 and is capable of extensive adjustment longitudinally of the arm 53. The other arm 60 of the bracket 56 extends substantially at a right angle to the arm 57 and is also provided with a longitudinal slot 61 by means of which different locating devices may be adjustably mounted on this arm 60. Several of these locating devices are shown in the drawings. Thus in Figs. 1, 2 and 3 there is adjustably mounted on this arm 60 a locating block or gauge 62. This may be provided with different locating means but in these figures it has a longitudinal substantially V-shaped groove 63 in its upper surface adapted to receive a similarly shaped projection or rib 64 on the work piece, such as a short shaft 65. If for example it is desired to cut or mill a transverse groove 66 to provide a flat surface 67 at a given angle with respect to the rib or extension 64, the gauge block 62 is properly located and at the desired angle so as to receive the rib or projection 64 when the piece 65 is clamped between the jaws, as indicated in Figs. 1, 2 and 3. This block 62 not only locates the workpiece at the proper angle but it also locates it at the proper height between the jaws so that all that is necessary is to locate the work piece between the jaws with the rib 64 seating in the groove 63 and then set the jaws to clamp the work piece. A plate 68 may be secured by screws across the end of the groove to provide an end stop against which the end of the rib 64 is brought to locate the work piece longitudinally in the jaws. This locates the piece properly with respect to the table 30 of the machine and the set up tools for cutting the transverse groove, as for example milling this groove. Then by feeding the table relative to the tool or the tool relative to the table the groove will be cut in the proper location, at the proper depth and the proper angle with respect to the rib 64, and after the block 62 is once set an indefinite number of similar work pieces may be similarly operated upon in succession, the block quickly and accurately locating each individual piece so that the transverse groove is cut in each piece in the same location, of the same depth and at the same angle. The block 62 may be mounted on the arm 60 by any suitable manner, but is shown as provided with extensions 69 embracing this arm through which a clamping bolt 70 passes which also passes through the slot 61 in the arm and serves to clamp the block in different adjusting positions on the arm.

In Fig. 4 is shown how such a stop and locating device may be used in a slightly different manner. In this case the stop and locating block 71 similar to the block 62, instead of having a groove cut in it to receive a rib or projection on the work piece, is itself relatively narrow or has a relatively narrow rib or projection to seat in a recess 72, such for example as a keyway or slot, in the work piece 73 which in this case is also a short shaft similar to the short shaft 65, on which is to be performed some other operation, such for example as cutting a transverse groove or flat 74 at the desired depth and angle. In locating this work piece all that is necessary is to place it between the jaws 19 and 22 with the block 71 seating in the keyway, this block 71 having been previously located at the proper angle and height by adjusting the arm 57 and bracket 56 at the proper angles and height and securing them in this position. The work piece 73 is thus accurately located and the flat or groove 74 may be cut as by milling or otherwise at the proper depth and at the desired angle relative to the keyway 72. A locating end plate or stop similar to the stop plate 68 may be mounted on this block 71 for limiting longitudinal movement of the work piece, the same as described in connection with Fig. 3. With this arrangement any desired number of work pieces 73 may be accurately and quickly mounted in the work holder or vise and the same operations performed on it, and all the pieces will be finished in the same manner and with the keyways and flats all in the same relative location without requiring a separate set-up of the locating means for each work piece.

In Figs. 5 and 6 is shown a slightly different gauge or locating block 75 mounted on the arm 60. In this case for the example shown all that is required is to cut or mill a transverse groove or flat 76 in the work piece 77, which in this case is a short shaft, at the proper longitudinal position and depth. Therefore the shaft 77 does not have to be located at any particular angle but it is required to be located at the proper longitudinal position and the proper height. Therefore the block 75 corresponding to the block 62 has a longitudinal groove 78 in its top surface into which the work piece 77 seats. This block 75 is adjusted to the proper height by adjusting the bracket 56 and then clamping it in position, then each individual work piece 77 is clamped between the jaws 19 and 22 while resting on the block 75 and its longitudinal position determined by the stop plate 68. Groove 76 can then be cut at the proper depth, and any desired number of work pieces may have the same flat or slot cut at the same angle and depth without further adjustment of the stop means.

It may sometimes happen that the work piece is narrower than the gauge blocks 62 and 75 and must be located between the jaws without projecting beyond the ends of the jaws. In this case a narrower stop or gauge may be used which may project into the space between the jaws. Such an arrangement is shown in Fig. 9 in which a relatively narrow stop 79 is mounted on the arm 60 of the bracket 56 and adjustable thereon both as to height and longitudinal position in the bracket. As shown in Fig. 9 the work piece 80 may be located by merely resting it on top of this stop which will locate it at the proper height in the jaws and the desired flat or groove 81 cut into this piece.

Similarly an end stop may be inserted between the jaws as shown in Fig. 10. In this case the end of the bracket arm 60 may itself be used as the end stop, or the bracket may be removed from the arm 53 and a stop screw 82 be adjustably mounted in the slot 54 of the arm 53 and clamped in adjusted position by suitable nuts 83 to form a limit stop for the work piece 84 held by the jaws.

As previously described the swivel base 32 may or may not be used with this work holder or vise as desired. When it is not used it is detached from the work holder proper, that is the body 11, and this body mounted directly on the machine table 30 or other support as a bench. When used in this manner additional locating blocks are preferably used to seat in and thus cooperate with the T-slots 31 in the table. Such a block is shown in Fig. 7 at 85 detachably mounted on the underside of the body side members 12 by any suitable means such as the screws 86. The block extends transversely between the side members and projects downwardly therefrom so as to project into and fit the upper part of the T-slots 31 and thus automatically locate the work holder at the proper angle on the table and supplement the clamping T-bolts 87 corresponding to the bolts 36. These blocks may also supplement and operate similarly to the locating blocks 49.

It will be evident from the above that this device makes a very useful construction of a work holder and vise which requires a minimum amount of material to secure the required strength, also that the jaws are very rigidly mounted so that the work is rigidly and accurately held in the desired position and that this construction in conjunction with the locating means for the work permits very accurate work and the rapid and efficient performance of similar operations on a large number of pieces in the same manner and very accurately, so that all the pieces are alike, giving greatly increased production and better and more accurate work.

Having thus set forth the nature of my invention what I claim is:

1. A work holder comprising a body including laterally spaced side members of substantially channel shaped cross section including upright webs and laterally and outwardly extending upper and lower flanges, longitudinal slots in the webs between the flanges, upright integral strengthening ribs extending between the flanges, work holding jaws including a movable jaw mounted on the side members and having a downward extension between said members, transverse pins carried by the extension projecting into the slots to guide the jaw, means for operating the movable jaw to clamp a work piece between the jaws, and means for mounting the body on a support.

2. A work holder comprising a body, work holding jaws on the body, an auxiliary base for the body comprising a lower member and an upper member, means pivoting the upper member on the lower member for turning movements about a vertical axis to various angular positions comprising a central upright bearing stud on one member projecting into a bearing opening on the other member, one of said members having a circular T-slot spaced outwardly from said stud, T-bolts in the other member running in said slot, means for clamping one of said bolts to secure the upper member in adjusted position, means for detachably mounting the body on the upper member, means for clamping the lower member on the table of a machine tool, and means for mounting said body directly on said table.

3. A work holder comprising a body including laterally spaced side members of substantially channel shaped cross section having upright webs and upper and lower laterally extending flanges, work holding jaws on the body, an auxiliary base comprising a lower member and an upper member mounted to swivel thereon, means for clamping the upper member in different angular positions, means cooperating with the lower flanges to detachably mount the body on the upper member, means for mounting the auxiliary base on the table of a machine tool, and means for mounting the body directly on said table.

4. A work holder comprising a body, work holding jaws including a movable jaw, means for operating the movable jaw to clamp a work piece between the jaws, means for securing the body to the table of a machine tool, a rod adjustably mounted on the holder and extending longitudinally of the jaws, an arm mounted on and extending laterally from the rod, and gauge means adjustably mounted on the arm to engage a work piece between the jaws and locate it in a given position therein.

5. A work holder comprising a body, work holding jaws including a movable jaw, means for operating the movable jaw to clamp a work piece between the jaws, a bearing, a rod adjustably mounted in the bearing, an arm extending laterally from the rod, a substantially L-shaped bracket adjustably mounted on the arm for longitudinal and angular movement, means for securing the bracket in adjusted positions, and means adjustably mounted on the bracket for locating the work pieces in a given position between the jaws.

6. A work holder comprising a body, work holding jaws including a movable jaw, means for operating the movable jaw to clamp a work piece between the jaws; a bearing, a rod adjustably mounted in the bearing, an arm extending laterally from the rod, a substantially L-shaped bracket, means for adjustably mounting one leg of the bracket on the arm for longitudinal and angular movement and for securing the bracket in adjusted positions, and a gauge member adjustably mounted on the other arm of the bracket to locate a work piece in a given position between the jaws.

7. A work holder comprising a body, work holding jaws including a movable jaw, means for operating the movable jaw to clamp a work piece between the jaws, a bearing, a rod adjustably mounted in the bearing, an arm extending laterally from the rod, a bracket adjustably mounted on the arm, and a gauge member mounted on the bracket adapted to cooperate with a shoulder on a work piece to determine the angular position of said piece between the jaws.

8. A work holder comprising a body, work holding jaws including a movable jaw, means for operating the movable jaw to clamp a work piece between the jaws, a bearing, a rod adjustably mounted in the bearing, an arm extending laterally from the rod, a bracket adjustably mounted on the arm, a gauge block mounted on the bracket, a work piece clamped between the jaws, and one of said members comprising the work piece and the block having a projection and the other of said members having a recess to receive said projection and cooperate therewith to angularly locate the work piece between the jaws.

9. A work holder comprising a body, work holding jaws including a movable jaw, means for operating the movable jaw to clamp a work piece between the jaws, a bearing, a rod adjustably mounted in the bearing, an arm extending laterally from the rod having a longitudinal slot therein, a substantially L-shaped bracket having a longitudinal slot in each leg thereof, means extending through the slots in the arm and one leg of the bracket to adjustably mount the bracket on the arm, a gauging member mounted on the other leg of the bracket adapted to locate a work piece in a given position between the jaws, and means cooperating with the slot in this leg to adjustably secure the gauging means on the bracket.

KAROL KOZAROCZY.